United States Patent
Cunningham et al.

(10) Patent No.: US 8,090,615 B1
(45) Date of Patent: *Jan. 3, 2012

(54) CONTROLLED OFFER REDEMPTION SYSTEM WITH DYNAMIC COOPERATIVE AND CHARITABLE OFFER MANAGEMENT

(75) Inventors: William R. Cunningham, Anna, IL (US); Richard W. White, Milton, FL (US)

(73) Assignee: Cunningham Electronics Corporation, Anna, IL (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/765,026

(22) Filed: Jun. 19, 2007

Related U.S. Application Data

(63) Continuation-in-part of application No. 11/202,768, filed on Aug. 12, 2005, now Pat. No. 7,877,289.

(60) Provisional application No. 60/601,194, filed on Aug. 13, 2004.

(51) Int. Cl.
*G06Q 30/00* (2006.01)
(52) U.S. Cl. .................................................. 705/14.27
(58) Field of Classification Search ........................ 705/14
See application file for complete search history.

(56) References Cited

U.S. PATENT DOCUMENTS

| | | | | |
|---|---|---|---|---|
| 4,882,675 A * | 11/1989 | Nichtberger et al. | ...... | 705/14.35 |
| 5,008,519 A * | 4/1991 | Cunningham et al. | ........ | 235/383 |
| 5,256,863 A * | 10/1993 | Ferguson et al. | ............... | 705/21 |
| RE37,166 E * | 5/2001 | Rando et al. | ............. | 235/462.36 |
| 6,766,301 B1* | 7/2004 | Daniel et al. | ............... | 705/14.26 |
| 7,013,286 B1* | 3/2006 | Aggarwal et al. | .......... | 705/14.26 |
| 2002/0055875 A1* | 5/2002 | Schulze et al. | ................... | 705/14 |
| 2002/0078361 A1* | 6/2002 | Giroux et al. | ................. | 713/183 |
| 2002/0128903 A1* | 9/2002 | Kernahan | ......................... | 705/14 |
| 2003/0001379 A1* | 1/2003 | Dixon et al. | ..................... | 283/52 |
| 2003/0061170 A1* | 3/2003 | Uzo | ............................... | 705/64 |
| 2003/0064713 A1* | 4/2003 | Deshpande | ................... | 455/414 |
| 2004/0054575 A1* | 3/2004 | Marshall | ......................... | 705/14 |
| 2004/0103023 A1* | 5/2004 | Irwin et al. | ...................... | 705/14 |
| 2004/0210484 A1* | 10/2004 | Lee | ................................. | 705/14 |
| 2005/0027598 A1* | 2/2005 | Greiner | ........................... | 705/14 |
| 2005/0033643 A1* | 2/2005 | Smith et al. | ..................... | 705/14 |
| 2005/0182695 A1* | 8/2005 | Lubow et al. | .................. | 705/28 |
| 2005/0225076 A1* | 10/2005 | McCreary et al. | .............. | 283/56 |
| 2006/0015404 A1* | 1/2006 | Tran | ................................ | 705/14 |
| 2006/0265281 A1* | 11/2006 | Sprovieri et al. | ............... | 705/14 |

(Continued)

FOREIGN PATENT DOCUMENTS
WO     WO 95/30199     * 11/1995

*Primary Examiner* — Namrata Boveja
*Assistant Examiner* — Matthew L Hamilton
(74) *Attorney, Agent, or Firm* — Levenfeld Pearlstein, LLC

(57) ABSTRACT

A controlled offer redemption system used to create dynamic cooperative offers and charitable offers, and to validate, verify, and redeem manufacturers' offers, retailers' offers, cooperative offers, dynamic cooperative offers and charitable offers, to restrict the redemption of cooperative, dynamic cooperative and retailers' offers to particular retailers and to authenticate the offer redemption transactions. The system includes a master registry, an offer redemption terminal in communication with a retailer's point-of-sale ("POS") system, a store portal and an offer clearinghouse. The offer system includes a means to generate an encrypted identifier ("token") which is unique to each offer redemption transaction. The clearinghouse independently recreates the token based on the offer redemption record and the purchase event transaction log and authenticates the transaction as having originated under the controlled conditions imposed by the system.

11 Claims, 12 Drawing Sheets

U.S. PATENT DOCUMENTS

| | | | |
|---|---|---|---|
| 2008/0262928 A1* | 10/2008 | Michaelis | 705/14 |
| 2008/0267500 A1* | 10/2008 | Keswani et al. | 382/173 |
| 2008/0270231 A1* | 10/2008 | Li et al. | 705/14 |
| 2009/0144164 A1* | 6/2009 | Wane et al. | 705/17 |
| 2011/0082731 A1* | 4/2011 | Kepecs | 705/14.17 |
| 2011/0103653 A1* | 5/2011 | Keswani et al. | 382/112 |
| 2011/0137718 A1* | 6/2011 | Scroggie et al. | 705/14.25 |

* cited by examiner

CEC Offer Redemption Terminal

Cunningham Electronics Corporation

Welcome back test_manufacturer@test.com.  Home | Logout

Manufacturer ID: 10  *Manufacturer's Console*

- Manufacturers
- Manage Coupons
- Accounting Summary

New Coupon Registration — All Fields are Compulsory.

Manufacturer Coupon Bar Code: [ ]   CFC Coupon Barcode: [ ]
( You MUST include ALL bar coded digits including lead and check digits)

Issue Number: [ ]
Drop Date: [ ]   Expiration Date: [ ]
Coupon Type:  ⊙ Cents Off   ○ Item Free

Cents Off

Coupon Value: [ ]
Purchase Requirements

| And/Or | Mfgr. ID | Item Code(s) | Quantity To Purchase |
|---|---|---|---|
| ○ ○ | [ ] | [ ] | [ ] |
| ○ ○ | [ ] | [ ] | [ ] |

Item Free

Free Item Mfgr. ID: [ ]   Free Item Code: [ ]
Maximum Coupon Value: [ ]
Purchase Requirements

| And/Or | Mfgr. ID | Item Code(s) | Quantity To Purchase |
|---|---|---|---|
| ○ ○ | [ ] | [ ] | [ ] |
| ○ ○ | [ ] | [ ] | [ ] |

[SUBMIT »]

© 2006 Cunningham Electronics Corporation. All rights reserved.

FIG. 10

Cunningham Electronics Corporation

Welcome back test_manufacturer@test.com.  Home | Logout

Manufacturer ID: 10  *Manufacturer's Console*

Registered Coupons (last 12 months)

| Coupon Bar Code | CFC Coupon BarCode | Issue Number | Drop Date | Expiration Date | Coupon Type | Edit Update |
|---|---|---|---|---|---|---|
| 3291539 | 0999999999924240131209 | 24243243242 | Jan 02, 2007 | Jan 31, 2007 | Cents Off | Edit Delete |
| 3291538 | 9999999999942340131209 | 423422343 | Jan 03, 2007 | Jan 31, 2007 | Cents Off | Edit Delete |
| 3291537 | 1654765373887651231208 | 87654678 | Dec 28, 2006 | Dec 31, 2006 | Cents Off | Edit Delete |
| 3291536 | 0000000555544441115205 | 1111 | Nov 07, 2006 | Nov 15, 2006 | Cents Off | Edit Delete |
| 3291535 | 0005456456424221123204 | 2422 | Nov 01, 2006 | Nov 23, 2006 | Cents Off | Edit Delete |
| 3291534 | 0000000547825411130208 | 2541 | Nov 02, 2006 | Nov 30, 2006 | Cents Off | Edit Delete |
| 3291533 | 0000012131313131123203 | 1313 | Nov 02, 2006 | Nov 23, 2006 | Cents Off | Edit Delete |
| 3291532 | 0000058974523221116205 | 2322 | Nov 02, 2006 | Nov 16, 2006 | Cents Off | Edit Delete |
| 3291531 | 0000254122512541130205 | 1254 | Nov 02, 2006 | Nov 30, 2006 | Cents Off | Edit Delete |
| 3291529 | 0000123654725781101207 | 25787 | Nov 02, 2006 | Nov 09, 2006 | Cents Off | Edit Delete |

Total Records : 51 - Showing Page : 1 of 6  [ Next » ]

[ CREATE NEW COUPON » ]

© 2006 Cunningham Electronics Corporation. All rights reserved.

FIG. 11

Cunningham Electronics Corporation

Welcome back test_manufacturer@test.com.                    Home | Logout

Manufacturer ID: 10                                    *Manufacturer's Console*

▸ Manufacturers

▸ Manage Coupons

▸ Accounting Summary

Coupon Details

Coupon Bar Code:  5555

Issue Number:  4444

Drop Date:  7-Nov-2006          Expiration Date:  15-Nov-2006

Coupon Type:  Cents Off

CENTS OFF

Coupon Value:           $ 33.00

Purchase Requirements

| Mfgr. ID | Item Code(s) | Quantity To Purchase |
|---|---|---|
| 33 | 33 | 33 |

© 2006 Cunningham Electronics Corporation. All rights reserved.

FIG. 12

CONTROLLED OFFER REDEMPTION SYSTEM WITH DYNAMIC COOPERATIVE AND CHARITABLE OFFER MANAGEMENT

CROSS-REFERENCE TO RELATED APPLICATIONS

This application is a continuation-in-part of U.S. patent application Ser. No. 11/202,768, filed on Aug. 12, 2005, which claims the benefit of U.S. provisional patent application Ser. No. 60/601,194, filed on Aug. 13, 2004, now abandoned.

BACKGROUND OF THE INVENTION

The present invention relates generally to offers (commonly known as "coupons") and, more particularly, to a controlled offer redemption system used to create dynamic cooperative offers (offers made cooperatively by a manufacturer and a retailer) and charitable offers, and to validate, verify, and redeem manufacturers' offers, retailers' offers, cooperative offers, dynamic cooperative offers and charitable offers, to restrict the redemption of cooperative, dynamic cooperative and retailers' offers to particular retailers and to authenticate the offer redemption transactions.

Manufacturers reimburse money to retailers based on the retailers' sales volume of the manufacturers' products. These reimbursements are referred to as "trade dollars." Theoretically, trade dollars are intended to be spent by the retailers to promote the manufacturers' products. Such is done by advertising and running specials in the retailers' stores, such as a large display of highly discounted soft drinks in the front of a retailer's store. The display and low price last for a few days and then are removed by the retailer.

However, manufacturers have no way of policing the expenditure of trade dollars by retailers. Most retailers do very little, if any, promotion of the manufacturers' products. Instead, most retailers treat trade dollars as a volume discount and put the money in their pocket. Some retailers run promotions just long enough to claim that they were run and put the remaining trade dollars in their pockets.

Retailers' offers and cooperative offers generally have been unaccepted by the industry because the prior art has not developed a system to control their redemption. Common retailer marketing strategies, such as accepting competitor's coupons, has deterred the use of such offers since manufacturers cannot correlate redemption of such offers with specific trade dollar expenditures.

Therefore, what is needed is a controlled manufacturers', retailers', and cooperative offer issuance and redemption system that has the ability to verify, validate, and redeem standard manufacturers' offers, retailers' offers, and cooperative offers, and also to restrict the redemption of retailers' and cooperative offers to particular retailers. Moreover, as further discussed below, it would be desirable that such a system is further configured to handle the creation and controlled redemption of dynamic cooperative offers as well as charitable offers.

A discussion of the prior art related to the redemption of manufacturers' offers follows to add perspective to the nature of the present invention.

Manufacturers' offers have become a valuable marketing tool for manufacturers and retailers seeking to increase sales and collect consumer demographic information. Although manufacturers' offers were first introduced decades ago, the process for redeeming manufacturers' offers has remained relatively unchanged.

The traditional manufacturer's offer redemption process typically involves consumer collection of published manufacturers' offers, often found in Sunday newspapers, direct mailings, and other publications. Manufacturers' offers are presented for redemption by the consumer to a retailer at the retailer's cash register when making a purchase.

The manufacturers' offers generally are inspected by the retailer's cashier to confirm the expiration date. Sometimes, but not regularly, the cashier may choose to review the purchased products to determine whether or not the consumer actually purchased the products (in the correct sizes, quantities, and/or combinations) required by the manufacturers' offers. The cashier then manually enters the values of the manufacturers' offers in the cash register for subtraction from the total purchase price.

The manufacturers' offers collected by retailers then are manually sorted and returned to the manufacturers for reimbursement. Typically, this is done by a professional clearinghouse. Retailers bundle together redeemed manufacturers' offers and ship them to the clearinghouse. The clearinghouse then sorts the manufacturers' offers by manufacturer and retailer and forwards the manufacturers' offers to the correct manufacturer along with an invoice for payment.

The manufacturer generally reviews the manufacturers' offers for evidence of fraud (for example, a large number of evenly cut offers) or other irregularities and then issues checks to the retailers, through the clearinghouse, based on the number of manufacturers' offers that the manufacturer deems valid. If some manufacturers' offers are deemed invalid, the retailers will not be paid for such offers. This is known as a "chargeback." Chargebacks then typically are deducted from retailers' future payments to the manufacturer for products delivered to the retailers. This time-consuming process creates additional costs for manufacturers, retailers, and, ultimately and ironically, consumers.

Not only is the traditional prior art manufacturer's offer redemption process costly, it is replete with opportunities to defraud manufacturers on various levels. For example, with the advent of relatively inexpensive and high-quality personal computer equipment, manufacturers' offers may be forged. Additionally, consumers may submit expired manufacturers' offers or manufacturers' offers for products, sizes, quantities, and/or combinations that were not actually purchased.

That is, traditional methods of manufacturer's offer redemption do not correlate a specific product sale to each specific redeemed manufacturer's offer at the time of redemption at the retailer. Moreover, it has been reported that fraudulent manufacturer's offer redemption schemes may have been used to finance terrorist organizations and other illegal activities.

In response to the spread of fraudulent redemption of manufacturers' offers, the prior art has seen several systems developed to counter such fraud. Some such systems make use of the universal product coupon codes ("UPCs") and UCC/EAN-128 extended barcodes that already appear on some manufacturers' offers. Manufacturers' offers encoded with UPC coupon and UCC-EAN-128 extended barcodes can be scanned by both traditional and customized point-of-sale ("POS") barcode readers.

It is expected that over the next several years, UPC coupon and UCC/EAN-128 extended barcodes will be supplanted by reduced space symbology ("RSS") barcodes which allow even more data to be stored in the same amount of space. Regardless of the format of the data appearing on the manufacturer's offer, it is expected that relevant data regarding the conditions of the offer will be coded on manufacturer's offers for the foreseeable future, and all such coding methods are included within the scope of the present disclosure.

On a manufacturer's offer, the coded manufacturer's offer data may include the manufacturer's offer expiration date, the offer value, the required product size and quantity, and the like. In some prior art retailer POS systems, the values of the manufacturers' offers are automatically deducted from the total purchase price using a scanning device to scan the coded manufacturers' offer data. Other prior art systems provide that as a manufacturer's offer is scanned, it may be checked against a database file to ensure that it is a valid offer. A valid offer, in this sense, means an offer that has been legitimately offered by the manufacturer and has not been fabricated.

Some prior art systems even go so far as to compare the manufacturer's offer coded data to the transaction log of purchased products to confirm that the required product actually was purchased in the correct size and quantity and, if so, to destroy or otherwise invalidate the manufacturer's offer. However, unless such a process is completed in a closed, controlled environment, with the ability to independently audit the manufacturer's offer redemption transaction, the possibility of fraud exists.

As discussed above, cooperative offers are joint offers made by a manufacturer and a retailer. Essentially, a cooperative offer is a manufacturer's offer that is permitted to be "added on" to by the retailer. For example, a manufacturer's $1 off coupon may be enhanced by an additional $1 off financed by the retailer. Thus, the consumer receives $2 off a product, with $1 paid by the manufacturer and $1 paid by the retailer.

Traditionally, the creation of cooperative offers has involved time-consuming communications and negotiations between manufacturers and retailers. This process can be especially laborious in light of the immense number of manufacturers, retailers, products and offers involved. To applicant's knowledge, the prior art has not addressed the need to simplify the creation of cooperative offers. Moreover, as discussed above, cooperative offers generally have been unaccepted by the industry because the prior art has not developed a system to appropriately control their redemption.

Because the increased use of cooperative offers is beneficial to both the manufacturing and retail industries, and to consumers, there exists a need for a system that not only simplifies and encourages the creation of cooperative offers, but also permits for the verification, validation, redemption, destruction and authentication of cooperative offers in a secure, closed environment.

Preferably, in such a system, the cooperative offers are able to be created dynamically, such that a large universe of retailers may have access to a large universe of manufacturers' offers available for use as cooperative offers, and such that each individual retailer can tailor the cooperative offer to suit its needs. More preferably still, such a system would also be capable of verifying, validating, redeeming, destroying and authenticating traditional manufacturers' offers (i.e., non-cooperative offers).

Similarly, it would be beneficial for the manufacturing and retail industries, as well as for consumers, to have a system that also permits for the verification, validation, redemption, destruction and authentication of charitable offers in a secure, closed environment.

In this context, charitable offers refer to manufacturers' offers, retailers' offers or cooperative offers which, when redeemed, direct a portion of the offer value to a charitable organization selected by the sponsor(s) of the offer. That is, the sponsor (or sponsors) of the offer—a manufacturer for a manufacturer's offer, a retailer for a retailer's offer, or a manufacturer and retailer for a cooperative offer—agree to designate a portion of the offer value to be donated to a charitable organization (or to an authorized intermediary that then directs the donated funds to a charitable organization).

For example, a manufacturer may designate a certain manufacturer's offer as a charitable offer. If the manufacturer's offer provides for $1 off of a qualifying product purchase, the manufacturer may designate that $0.50 of the offer value will be donated to a charitable organization. That is, when a consumer redeems a charitable offer, the consumer will receive $0.50 off of the purchase price of the product, and the remaining value of the offer ($0.50) will be donated to the charity selected by the manufacturer (or an authorized intermediary).

Alternatively, the charitable offer may be structured such that when the consumer redeems the charitable offer, the consumer receives the full value of the offer ($1 off a qualifying product, using the preceding example), but the manufacture (and/or other offer sponsor(s)) agree to donate an additional amount to a charitable organization. That is, in one anticipated scenario, upon redemption of the charitable offer, the consumer receives full credit for the offer value, the retailer receives full reimbursement of the offer value from the manufacturer and the manufacturer then donates an additional amount (say $0.50) to the charitable organization.

Charitable offers, in this sense, are not known in the prior art, and it would be generally advantageous for the industry, charitable organizations and society as a whole if such offers could be utilized on a wide scale basis.

Therefore, what is needed to eliminate fraud and to permit the proper redemption of manufacturers', retailers', cooperative and charitable offers is a closed system—a controlled offer redemption environment in which manufacturers' offers, retailers' offers, cooperative offers and charitable offers may be verified, validated, redeemed, and destroyed to prevent re-use, in which the redemption transaction is authenticated to confirm that the offer in fact was redeemed under the controlled conditions imposed by the system, and in which redemption of retailers' offers and cooperative offers is limited only to the retailers that issued the offers or the retailers with whom the manufacturers have cooperatively issued the offers.

What is also needed is a system that simplifies the process of creating and redeeming dynamic cooperative offers as well as a system that manages the creation and distribution of charitable offers. The present invention satisfies this need.

BRIEF SUMMARY OF THE INVENTION

The present invention is a closed system that eliminates fraud in the offer redemption process and allows manufacturers' offers, retailers' offers, cooperative offers and charitable offers to be redeemed under controlled conditions. Moreover, the system may also be used to create dynamic cooperative offers and to manage the creation and distribution of charitable offers.

The system utilizes an offer redemption terminal consisting of a housing containing a scanner for reading the data on coded offers, a shredder to render the offers invalid for subsequent use, and a means to generate an encrypted identifier, or "token," which is unique to each offer redemption transaction. The encrypted token is attached to the point of sale ("POS") purchase event transaction, and is used to verify that the transaction originated under the controlled conditions imposed by the system.

The offer redemption terminal is connected to a cash register that is part of the retailer's POS system and, upon activation, receives the purchase event transaction log identifier, current date and other information from the cash register. The purchase event transaction log identifier, along with the coded offer data, the current date, and other information form the basis of the encrypted token.

When the transaction is later submitted for reimbursement and/or audited, a token is independently regenerated from the purchase event transaction log to compare to the token generated during the transaction. Since the token generated during the transaction can only have originated under the controlled conditions imposed by the operation of the offer redemption terminal, which includes destruction of the redeemed offer and redemption of retailers' and cooperative offers only by authorized retailers, the authenticity of the transaction therefore is verified if the tokens match.

The offer redemption terminal is operated by inserting a manufacturer's offer, retailer's offer, cooperative offer or charitable offer into a slot with the data coded on the offer oriented for the scanner to read the coded data. The scanner senses the presence of the offer, reads the coded data, and communicates the coded data to the POS terminal for verification and validation using a database registry of known valid manufacturers', retailers', cooperative and charitable offers.

If the offer is valid and the offer's terms have been satisfied, the cash register activates the offer redemption terminal's shredder which pulls the offer through the shredder and destroys it. Upon sensing that the offer has been shredded, the offer redemption terminal generates the token and communicates it to the cash register where the transaction is then posted and the token is attached to the offer redemption record in the purchase event transaction log.

The system further includes a master offer registry where manufacturers' offers, retailers' offers, cooperative offers and charitable offers are registered. The offer registry provides the source of offer data against which each offer is validated and verified. The offer registry is downloaded to the retailer's POS systems and updated on a regular basis. The data is stored in the retailer's POS system in the form of a database, where the offers can be matched to the database records to insure that altered or unapproved offers are not redeemed.

The system also includes a clearinghouse to facilitate settlement of accounts between manufacturers and retailers. The clearinghouse also serves to verify that offer transactions submitted for payment are valid. Purchase events containing offer redemption transactions with tokens are screened for authenticity by recreating a token based on the purchase event information. If the recreated token matches the token that was attached to the offer transaction, then the transaction is deemed authentic. The clearinghouse further authenticates the transaction by revalidating and reverifying the offer using the data from the offer registry and the purchase event transaction log.

In the preferred embodiment, the controlled offer redemption system of the present invention further includes a dynamic cooperative offer generation system interactively coupled with the system. The dynamic cooperative offer generation system is configured to permit the creation of dynamic cooperative offers.

In this sense, dynamic cooperative offers refer to manufacturers' offers designated by the manufacturer as eligible to be combined with a retailer's offer to form a cooperative offer. The resulting cooperative offer is "dynamic" because its redemption terms (including the value of the cooperative offer) are established by the retailer "on the fly," and the resulting cooperative offer is immediately generated by the system and made available to the retailer as a downloadable graphics file.

In the preferred embodiment, the dynamic cooperative offer generation system is a web-based system that provides manufacturers with a link from a website to the master offer registry. The dynamic cooperative offer generation system enables manufacturers to designate certain of the manufacturers' offers registered in the registry as available for use as cooperative offers. That is, such designated manufacturers' offers are available to retailers for use as cooperative offers (offers whose discount value may be increased by contributions from the retailers).

The dynamic cooperative offer generation system also allows retailers to access the master offer registry through the website. Retailers are able to access a list of all manufacturers' offers that have been designated by manufacturers as available for use as cooperative offers. Retailers then select the specific manufacturer's offer they wish to convert to a cooperative offer and specify the retailers' portion of the discount value of the offer.

The dynamic cooperative offer generation system then generates a new cooperative offer based on the combined value of the original manufacturer's offer and the retailer's additional discount value and registers the new cooperative offer in the master offer registry. Like all other cooperative offers registered in the master offer registry, cooperative offers generated by the cooperative offer generation system include identification of the sponsoring retailer and the discount value added by the sponsoring retailer.

Additionally, upon creation of the dynamic cooperative offer, the dynamic cooperative offer generation system generates an electronic copy of the dynamic cooperative offer that includes coded data identifying the offer. The electronic copy of the dynamic cooperative offers is made available for download to the retailer to be included in the retailer's advertising circulars and/or distributed in-store. The coded data on the dynamic cooperative offer identifies the sponsoring retailer and, in conjunction with the controlled offer redemption system of the present invention, restricts redemption of the dynamic cooperative offer only to the sponsoring retailer's stores.

In the preferred embodiment of the controlled offer redemption system of the present invention, manufacturers' offers, retailers' offers and cooperative offers may be designated as charitable offers. As charitable offers, the sponsor (or sponsors) of the offer—a manufacturer for a manufacturer's offer, a retailer for a retailer's offer, or a manufacturer and retailer for a cooperative offer—agree to designate a portion of the offer value to be donated to a charitable organization.

Charitable offers may be distributed by manufacturers and retailers through traditional offer distribution means (such as newspaper inserts) and, in one embodiment of the present invention, charitable offers may be distributed using an in-store charitable offer distribution kiosk. In such a kiosk, images of charitable offers registered in the controlled offer redemption system of the present invention are displayed on a touch screen. A customer selects desired charitable offers on the touch screen and a printing device disposed within the kiosk prints the charitable offers for the customer.

When the customer satisfies the purchase conditions of the charitable offer and presents the charitable offer for redemption, the offer is verified, validated, redeemed, and destroyed like any other offer registered in the controlled offer redemption system. However, when the charitable offer is processed for payment by the clearinghouse, the portion of the offer value designated for donation is directed to the charitable organization (or to an authorized intermediary for ultimate distribution to a charitable organization), while the remaining offer value is paid to the retailer.

It is therefore a principal object of the present invention to provide a system to validate, verify, and redeem manufacturers' offers, retailers' offers, cooperative offers, dynamic cooperative offers and charitable offers, and to authenticate the redemption of such offers.

An additional principal object of the present invention to provide a controlled offer redemption system that eliminates fraud.

Another object of the invention is to provide a controlled offer redemption system that reduces costs to manufactures, retailers, and consumers.

A further object of the present invention is to provide a controlled offer redemption system that verifies the validity of an offer before redeeming it.

Yet another object of the present invention is to provide a controlled offer redemption system that generates an encrypted token to verify and authenticate an offer redemption transaction.

It is another object of the present invention to provide a controlled offer redemption system that is interoperable with a retailer's point of sale system.

Another object of the present invention is to provide a controlled offer redemption system that includes a means to prevent re-use of an offer once it has been validated and redeemed.

A further object of the present invention is to provide a controlled offer redemption system that is a closed system.

An additional object of the present invention is to provide a controlled offer redemption system that manages the redemption of offers under controlled conditions.

It is another object of the present invention to provide a controlled offer redemption system that maintains a master registry of valid offers.

Yet another object of the present invention is to provide a controlled offer redemption system that is to provide an offer clearinghouse for authenticating offer redemption transactions prior to payment for the transactions from the manufacturer to the retailer.

An important object of the present invention is the creation and retention of a complete audit trail of all redeemed offers cleared by the invention which is preserved at the clearinghouse for a specific period of time for review.

It is a further object of the present invention to provide a system that allows for the dynamic creation of cooperative offers.

An additional object of the present invention is to allow for the creation and redemption of charitable offers.

Other and more specific objects will in part be obvious and will in part appear hereinafter.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 10 is an exemplary interface depicting how manufacturers may directly enter offers into the master offer registry in the preferred embodiment of the present invention;

FIG. 11 is an exemplary interface depicting how manufacturers may view all offers registered in the master offer registry in the preferred embodiment of the present invention; and, FIG. 12 is an exemplary interface depicting how manufacturers may view details regarding offers registered in the master offer registry in the preferred embodiment of the present invention.

DETAILED DESCRIPTION OF THE INVENTION

Figure 1:
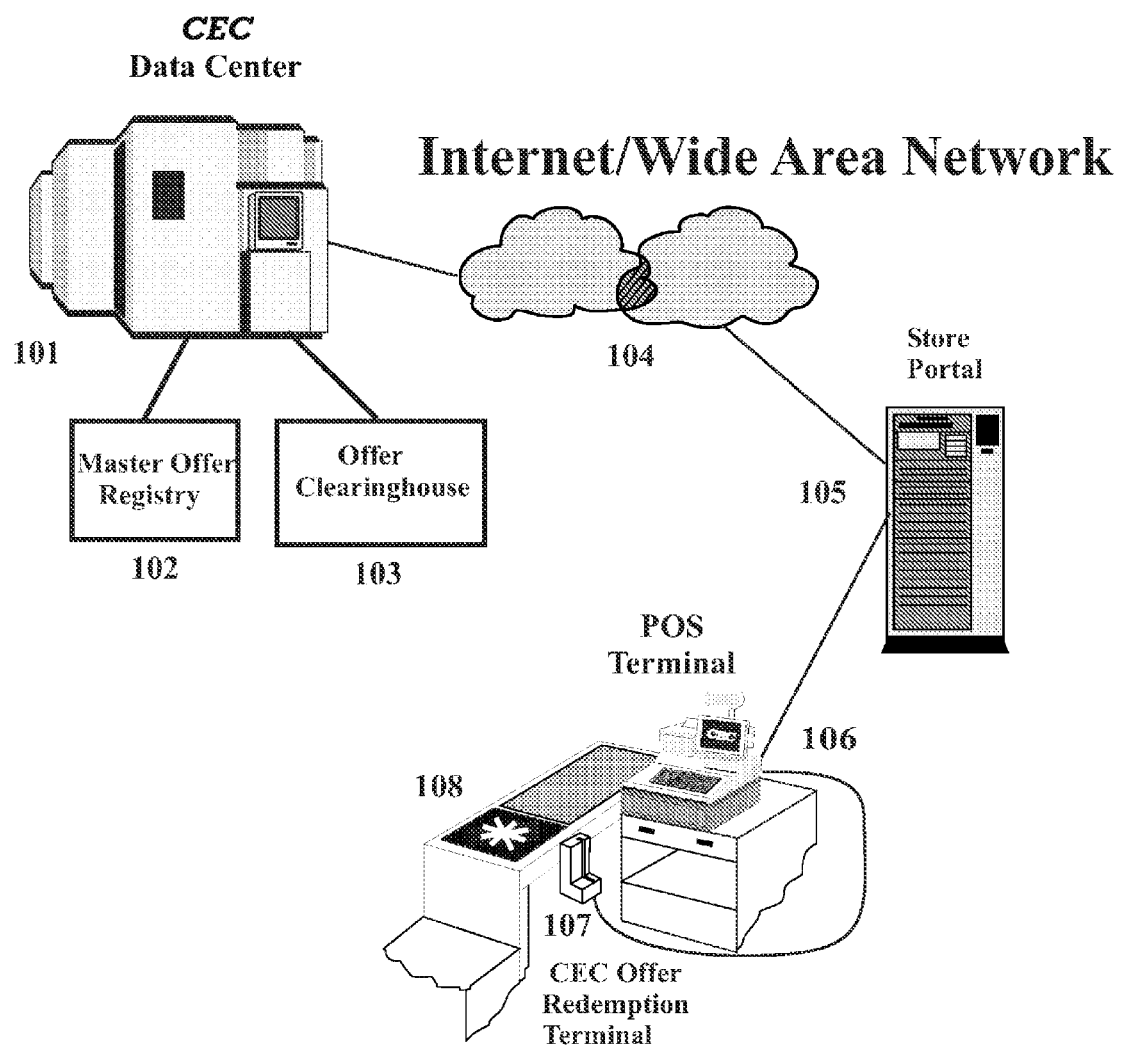
FIG. 1 is a diagram showing relation of the major components of the controlled offer redemption system in the preferred embodiment of the present invention.

While the present invention is susceptible of embodiment in various forms, there are shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

The preferred embodiment of the controlled offer redemption system of the present invention is shown in FIGS. 1 through 9 and is further described herein. As shown in FIG. 1, the system consists of three primary components in the preferred embodiment: the master offer registry 102, the offer redemption terminal 107, and the offer clearinghouse 103.

In the preferred embodiment, the master offer registry 102 and the offer clearinghouse 103 both are stored within a single central data center 101, comprising at least one suitable computer and/or server as well known in the prior art. It will be appreciated, however, that the master offer registry 102 and the offer clearinghouse 103 could be separately stored on suitable computers and/or servers without affecting the operability of the system and without departing from the spirit of the present invention.

FIG. 1 shows the general operational relationship between the major components of the system in the preferred embodiment. The master offer registry 102, as further discussed below, is an electronic database of manufacturers', retailers', cooperative (including dynamic cooperative) and charitable offers. It is stored on any suitable software-programmable computer and/or server known in the art.

In the preferred embodiment, the master offer registry 102 is stored in data center 101. In turn, data center 101 is capable of communicating with a store portal 105, located at a retailer's physical store location. In the preferred embodiment, such communications occur over a worldwide computer network 104, such as the Internet; however, such communications may occur using prior art dial-up or other networking methods. Additionally, in the preferred embodiment, communications between the store portal 105 and the data center 101 are encrypted or otherwise securely transmitted to protect the integrity and confidentiality of the data.

As further shown in FIG. 1, the store portal 105 also is a software-programmable computer and/or server known in the art and is capable of monitoring the POS terminal's(s') 106 communications on an in-store POS network. Communication between store portal 105 and POS terminal(s) 106 is accomplished through traditional prior art data communications means, such as an in-store POS network. Using traditional prior art communications means, an offer redemption terminal 107 is connected to each POS terminal 106. Lastly, as well known in the prior art, a product scanning device 108 also interfaces with each POS terminal 106.

The operation of a traditional POS system is well known in the prior art. A product to be purchased is scanned by product scanning device 108 to identify and decode the unique product-identifying coded data typically printed on the exterior of the product's packaging. Scanning device 108 then cooperates with POS terminal 106 to identify the product being purchased and print a customer receipt. In the preferred embodiment of the present invention, store portal 105 monitors POS terminal's(s') 106 communications and creates a duplicate copy of the transaction.

The present invention builds on this well-known and well-tested POS system model to add offer validation, verification, redemption and authentication as discussed in detail below.

Figure 9:
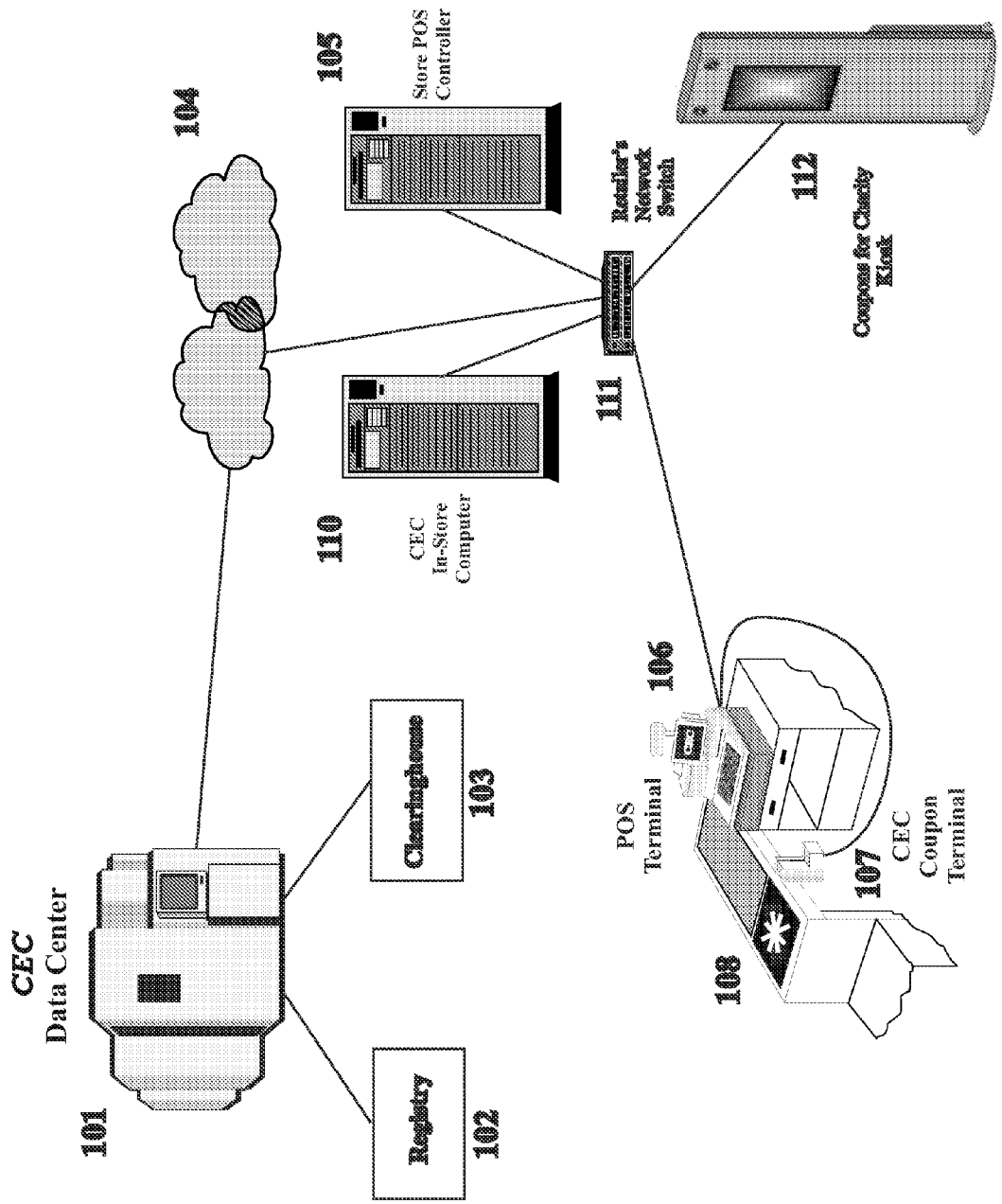
FIG. 9 is a diagram showing relation of the major components of the controlled offer redemption system in the preferred embodiment of the present invention, shown with a charitable offer distribution kiosk for the distribution of charitable offers in one embodiment of the present invention.

An alternate embodiment of the controlled offer redemption system of the present invention is shown in FIG. 9. In the alternate embodiment, the system still consists of three primary components: the master offer registry 102, the offer redemption terminal 107, and the offer clearinghouse 103. As in the preferred embodiment, the master offer registry 102 and the offer clearinghouse 103 both are stored within a single central data center 101, comprising at least one suitable computer and/or server as well known in the prior art. It will be appreciated, however, that the master offer registry 102 and the offer clearinghouse 103 could be separately stored on suitable computers and/or servers without affecting the operability of the system and without departing from the spirit of the present invention.

As in the preferred embodiment, the master offer registry 102 is stored on any suitable software-programmable computer and/or server known in the art, and is preferably stored in data center 101. In turn, data center 101 is capable of communicating with a store POS controller 105 located at a retailer's physical store location (it will be appreciated that the present disclosure uses the terms "store portal" and "store POS controller" interchangeably to refer to the component as it appears in both the preferred embodiment (FIG. 1) and the alternate embodiment (FIG. 9)). Such communications occur over a worldwide computer network 104, such as the Internet; however, such communications may occur using prior art dial-up or other networking methods. Additionally, as in the preferred embodiment, communications between the store POS controller 105 and the data center 101 are encrypted or otherwise securely transmitted to protect the integrity and confidentiality of the data.

As further shown in FIG. 9, the store POS controller 105 also is a software-programmable computer and/or server known in the art and is capable of monitoring the POS terminal's(s') 106 communications on an in-store POS network controlled by a network switch 111. Also connected to network switch 111 are a controlled offer redemption system computer 110, configured to locally store and update the local copy of the master offer registry 102 and to perform and coordinate offer verification, validation, redemption and destruction, and a charitable offer kiosk 112 configured to control the distribution of charitable offers.

As in the preferred embodiment, an offer redemption terminal 107 is connected to each POS terminal 106 using traditional prior art communications means, and a product scanning device 108 is interactively coupled with each POS terminal 106, as is known in the art. The operation of this embodiment of the controlled offer redemption system of the present invention is similar to the operation of the system in the preferred embodiment, as discussed above.

Offer Registry

As discussed above, the master offer registry 102 (or, "registry" or "master registry") is an electronic database of all valid participating manufacturers', retailers', cooperative (including dynamic cooperative) and charitable offers that may be verified, validated, redeemed, and destroyed using the controlled offer redemption system of the present invention.

Figure 2:
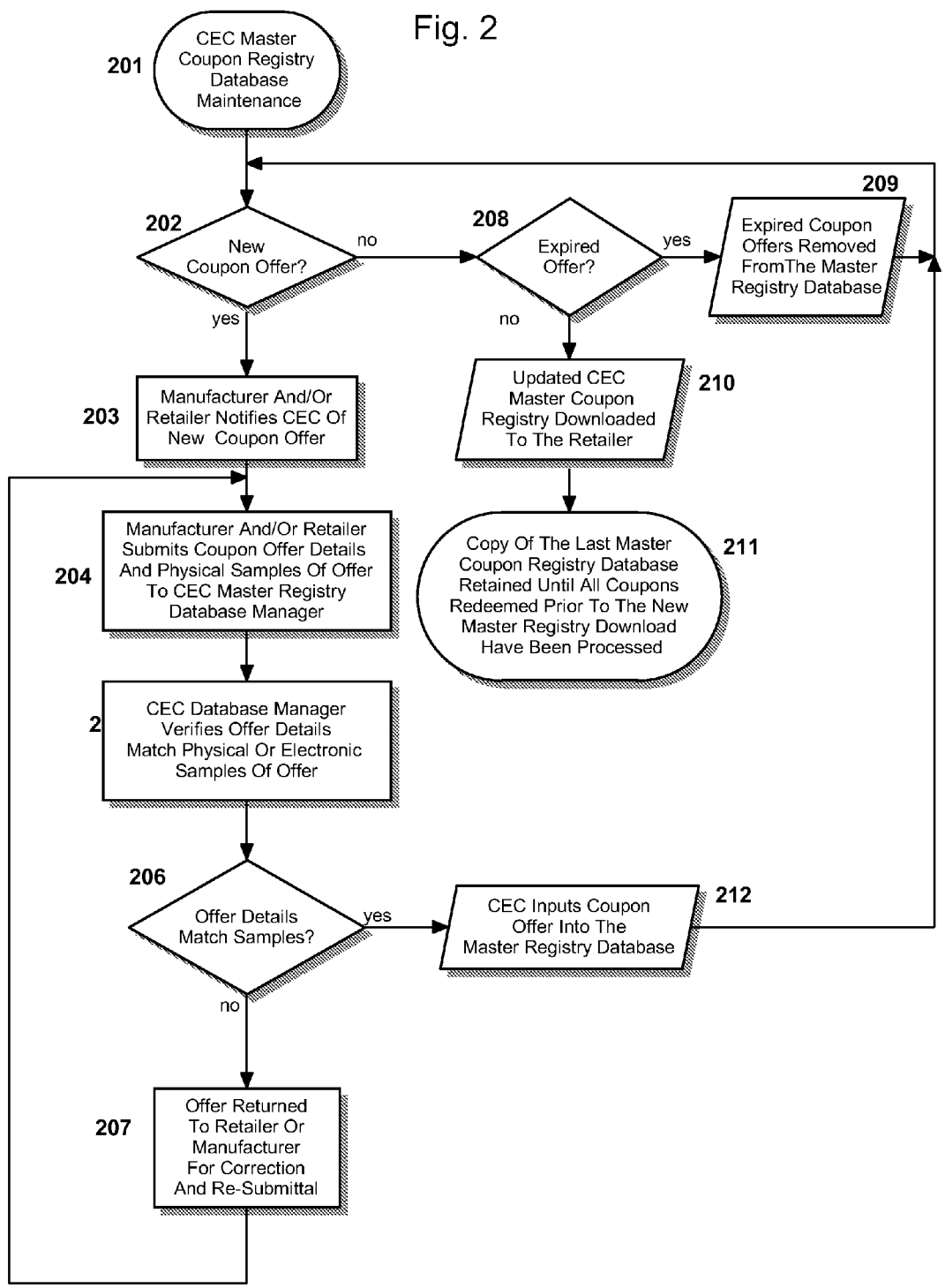
FIG. 2 is a flowchart showing the operation of the master offer registry in the preferred embodiment of the present invention.

FIG. 2 is a flowchart showing operation of the master offer registry 102. The master offer registry 102 preferably is maintained at a central location, such as the data center, and is updated on a regular, consistent basis to ensure that the offer data within it is accurate and up-to-date. A copy of the entire master offer registry 102 initially is transmitted to a retailer upon the retailer's participation in the system, and the copy of the master registry 102 is stored on the store portal 105 or the controlled offer redemption system computer 110, depending on the embodiment. Thereafter, updates to the master registry are disseminated to the retailer on a regular basis, such as nightly, weekly, or as otherwise needed.

To minimize the amount of data traffic, and the time for registry update data transmissions, registry data updates preferably are transmitted in an ADD/DELETE format, meaning that the entire master offer registry 102 need not be downloaded each time an update is required (however, a full copy of the registry can be downloaded if needed, such as for disaster recovery or other purposes). To further minimize the amount of data traffic, data may be expressed in a number series range format, rather than as a discrete series of numbers.

As shown in FIG. 2, maintenance 201 of the master registry 102 involves the addition of new offers and the removal of expired offers. To add 202 a new offer, the manufacturer and/or retailer first notifies 203 the registry manager of the existence of a new manufacturer's offer. Notification can be by any appropriate means, including by electronic mail, by fax, by secure online (Internet) connection, or by phone (although written notification is preferred in the preferred embodiment). The manufacturer then assembles all pertinent information regarding the new offer and transmits it to the registry database manager 204.

In the preferred embodiment, this information includes the following data for a manufacturer's offer:

the product family item codes affected by the offer;
the Uniform Code Council (UCC)-assigned ID number that is printed on the offer;
the product family code that is printed on the offer;
the offer's UCC-assigned value code that is printed on the offer;
the assigned offer issue number that is printed on the offer;
the designated drop date for the offer;

the designated expiration date for the offer that is printed on the offer;

the specific retailer(s) authorized to redeem the offer for cooperative offers; and, a physical, lithographic proof or electronically formatted copy of the offer.

The registry data for a retailer's offer or a cooperative offer is similar, but also includes at least an identification of the specific retailer(s) who is(are) authorized to redeem the offer. Moreover, in the case of a cooperative offer, the offer itself includes contractual restrictions that prevent the offer from being redeemed through unauthorized retailers. For charitable offers, the registry data also includes the identification of the charitable organization (or authorized intermediary) designated to receive funds upon redemption of the offer, along with the portion of the charitable offer value that is to be donated upon redemption of the offer.

In the preferred embodiment, the registry database manager verifies the offer information against the offer details supplied by the manufacturer and/or retailer for accuracy 205. If the data matches 206, the offer data is added to the registry 212. If the offer data and the physical samples do not match, the offer is returned to the manufacturer and/or retailer for correction and re-submittal 207.

In other embodiments of the present invention, maintenance 201 of the master offer registry 102 may be accomplished directly by the manufacturer or retailer. In such an embodiment, the direct maintenance of the master offer registry 102 may be accomplished through an Internet website interactively coupled to the master offer registry 102. Under this configuration, a manufacturer (or other offer sponsor) may be given secure access (such as through a user name and password system as is known in the art) to the master offer registry 102 to maintain the manufacturer's registered offers.

For example, as shown in FIGS. 10-12, a manufacturer may be provided with a secure web interface (FIG. 10) configured such that the manufacturer may enter the relevant information to add a new offer to the master offer registry 102.

As shown in FIG. 11, the manufacturer preferably may also access a list of all of the manufacturer's offers registered in the master offer registry 102 and may view the details of any registered offers (FIG. 12). The manufacturer may also be given the option to delete or edit any registered offers (FIG. 11). Preferably, any offer data entered directly by the manufacturer or retailer is still subject to final approval by the registry database manager before the offer is made active in the master offer registry. However, such final approval may not be required in all embodiments of the present invention.

It should be noted that the general design and functionality of online database maintenance systems and interfaces, as is shown in FIGS. 10-12, are well known to those skilled in the art and need not be explained in detail in the present disclosure.

In the preferred embodiment, the master offer registry data is downloaded 210 to the retailers' stores via the Internet or a direct dial-up connection to the master offer registry host computer using traditional prior art data communication means. However, any comparable data communications means may be used.

An offer's drop date and expiration date control when that offer's record is added to, and removed from, the master offer registry; thus, an offer is removed from the master offer registry following the offer expiration date 208, 209. Finally, copies of prior master offer registries are maintained until all of the offers redeemed under such registries are processed 211.

Dynamic Cooperative Offer Generation System

In the preferred embodiment of the controlled offer redemption system of the present invention, a dynamic cooperative offer generation system is interactively coupled with the controlled offer redemption system. As discussed above, the dynamic cooperative offer generation system is configured to permit the creation of dynamic cooperative offers.

In this sense, dynamic cooperative offers refer to manufacturers' offers designated by a manufacturer as eligible to be combined with a retailer's offer to form a cooperative offer. The resulting cooperative offer is "dynamic" because its redemption terms (including the value of the cooperative offer) are established by the retailer "on the fly."

Figure 8:
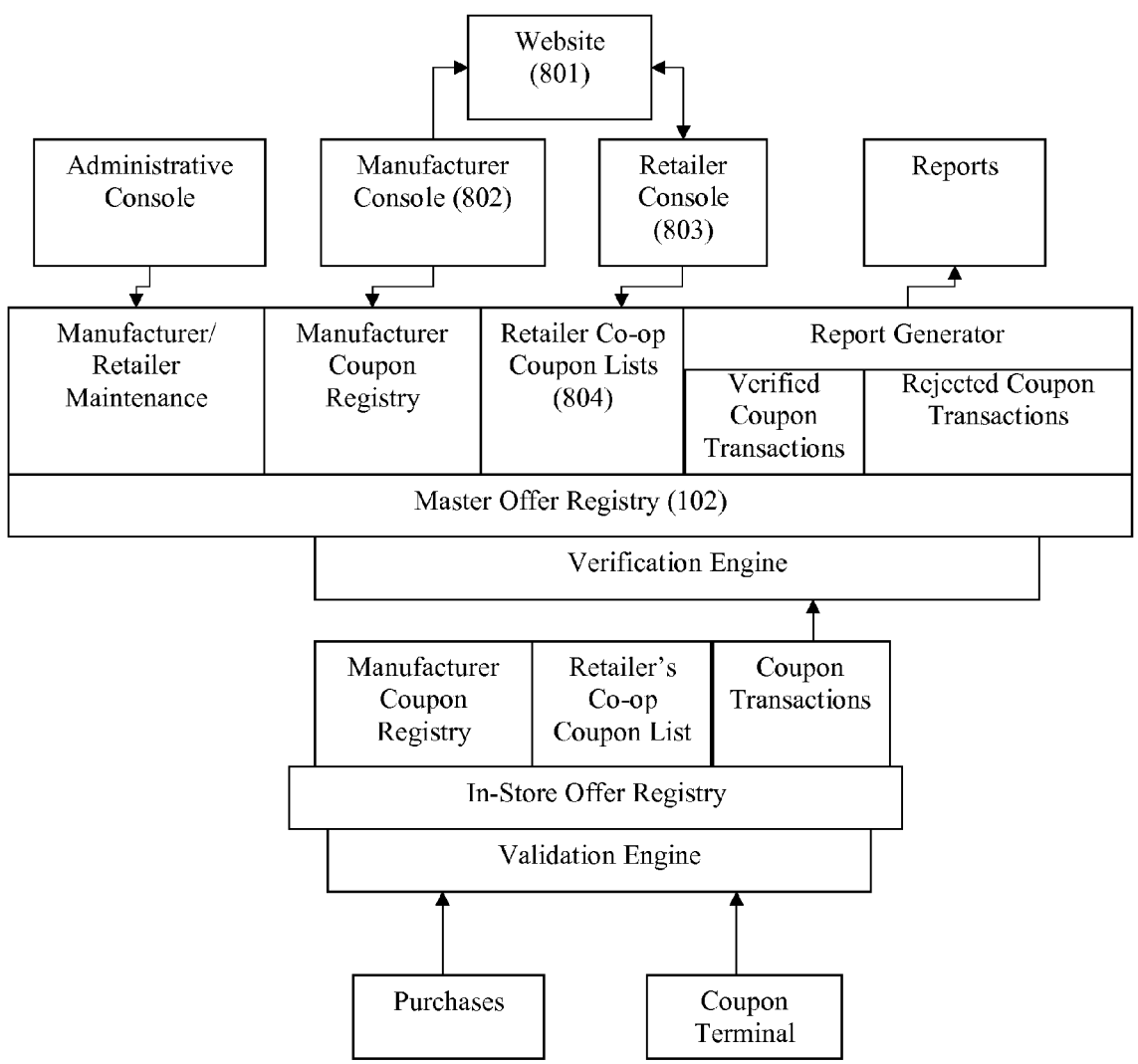
FIG. 8 is a schematic diagram of the dynamic cooperative offer generation system as interoperably coupled with the controlled offer redemption system of the present invention.

FIG. 8 shows the preferred embodiment of the dynamic cooperative offer generation system as integrated within the preferred embodiment the controlled offer redemption system of the present invention.

In the preferred embodiment, the dynamic cooperative offer generation system is a web-based system that provides manufacturers with a link from a website 801 (preferably through a secure web interface) to the master offer registry 102 through a manufacturer's console 802. In embodiments of the controlled offer redemption system of the present invention that include a web interface for the direct maintenance 201 of master offer registry 102, as discussed above, website 801 of the dynamic cooperative offer generation system may comprise the same web interface.

Website 801 is configured to permit manufacturers to designate certain of the manufacturers' offers registered in the master offer registry 102 as available for use as cooperative offers. This may be done, for example, by including an appropriate checkbox on the web interface for adding a new offer to the master offer registry 102 (for example, by adding the checkbox to the interface shown in FIG. 10), and/or by including an appropriate checkbox on the web interface (not shown) for editing an existing registered offer. In either case, the offer record in the master offer registry 102 includes an indication that the manufacturer has approved the offer for use as a cooperative offer.

In the preferred embodiment of the of the dynamic cooperative offer generation system of the present invention, website 801 is further configured to permit retailers to access the master offer registry 102 and to view manufacturer's offers that have been identified by manufacturers as available for use as cooperative offers 804, preferably through a retailer's console 803. A retailer may then select a particular manufacturer's offer and customize the manufacturer's offer to include the retailer's portion of the total discount value of the offer. That is, a retailer may, for example, add $1 to an existing $1 off manufacturer's offer, thus creating a cooperative offer with a total offer value of $2.

Based on the discount value added by the sponsoring retailer, the dynamic cooperative offer generation system then creates a new cooperative offer based on the combined value of the original manufacturer's offer and the retailer's additional discount value, and registers the new cooperative offer in the master offer registry 102. Like all other cooperative offers registered in the master offer registry 102, cooperative offers generated by dynamic cooperative offer generation system include identification of the sponsoring retailer and the discount value added by the sponsoring retailer.

Additionally, upon creation of the dynamic cooperative offer, the dynamic cooperative offer generation system generates an electronic copy of the dynamic cooperative offer that includes coded data identifying the dynamic cooperative offer's terms. The coded data on the dynamic cooperative offer identifies the sponsoring retailer and, in conjunction with the controlled offer redemption system of the present invention, restricts redemption of the dynamic cooperative offer only to the sponsoring retailer's stores.

The electronic copy of the dynamic cooperative offer is made available for download by the retailer through the retailer's console 803, and preferably is formatted in a universal graphics format, such as PDF (portable document format) or JPG, so that the dynamic cooperative offer can be readily reproduced in the retailer's advertising circulars and/or distributed in-store.

When a dynamic cooperative offer is redeemed, as discussed below, the customer receives the full value of the offer while the retailer bears its added discount value and the manufacturer reimburses the retailer for the original value of the offer.

Charitable Offers

Much like the designation of manufacturer's offers as available for use as cooperative offers, in the preferred embodiment of the controlled offer redemption system of the present invention, certain manufacturers' offers, retailers' offers and cooperative offers may be designated as charitable offers. As charitable offers, the sponsor (or sponsors) of the offer—a manufacturer for a manufacturer's offer, a retailer for a retailer's offer, or a manufacturer and retailer for a cooperative offer—agree to designate a portion of the offer value to be donated to a charitable organization.

For example, a manufacturer's offer may be designated as a charitable offer in much the same way a manufacturer's offer is designated as available for use as a cooperative offer. As shown in FIG. 8, manufacturers are provided with a link from a website 801 (preferably through a secure web interface) to the master offer registry 102 through a manufacturer's console 802. In embodiments of the controlled offer redemption system of the present invention that include a web interface for the direct maintenance 201 of master offer registry 102, as discussed above, website 801 may comprise the same web interface.

In this manner, website 801 would be configured to permit manufacturers to designate certain of the manufacturers' offers registered in the master offer registry 102 as charitable offers. This may be done, for example, by including an appropriate checkbox on the web interface for adding a new offer to the master offer registry 102 (for example, by adding the checkbox to the interface shown in FIG. 10), and/or by including an appropriate checkbox on the web interface (not shown) for editing an existing registered offer, along with a field to indicate the amount of the offer value that is designated to be donated to the charity and a field to indicate the chosen charitable organization (or authorized intermediary).

In some embodiments of the present invention, donations to charitable organizations may be coordinated through an authorized intermediary organization, such as a not-for-profit company established for the purpose of managing such donations.

Charitable offers registered in the controlled offer redemption system of the present invention may be advertised and distributed by manufacturers and retailers through traditional offer distribution means (such as newspaper inserts), and by doing so the sponsor(s) of the charitable offers receive the customer goodwill associated with being a charitable business.

In one embodiment of the present invention, as shown in FIG. 9, charitable offers may be distributed using an in-store charitable offer distribution kiosk 112. The design and operation of such offer distribution kiosks is generally known to those skilled in the art. Kiosk 112 is interactively coupled to the controlled offer redemption system computer 110 such that the kiosk is able to access the details of charitable offers registered in the offer registry.

In such a kiosk 112, images of charitable offers registered in the offer registry are displayed on a touch screen. A customer selects desired charitable offers on the touch screen and a printing device disposed within the kiosk prints the charitable offers for the customer. The customer may then present the charitable offer for redemption along with the customer's other offers.

When the customer satisfies the purchase conditions of the charitable offer and presents the charitable offer for redemption, the offer is verified, validated, redeemed, and destroyed, as described below, like any other offer registered in the controlled offer redemption system. However, when the charitable offer is processed for payment by the clearinghouse 103, the portion of the offer value designated for donation is directed to the charitable organization (or to the authorized intermediary for ultimate distribution to a charitable organization), while the remaining offer value is paid to the retailer, as discussed below.

Offer Validation and Verification Process

Figure 3:
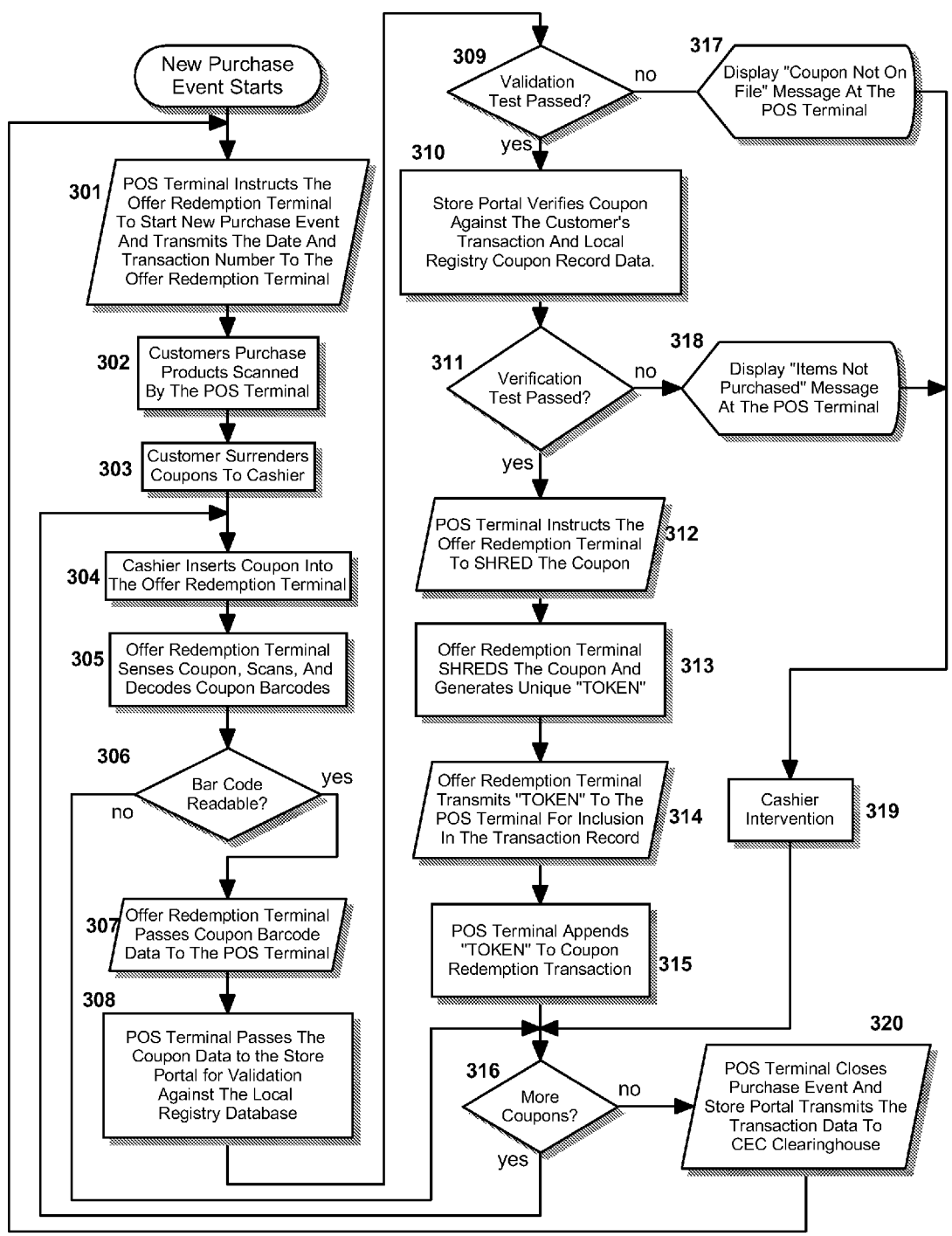
FIG. 3 is a flowchart showing the operation of the store portal offer validation and verification process in the preferred embodiment of the present invention.

As shown in FIG. 3, the offer validation and verification process begins when the retailer's POS terminal initiates a new purchase event record and transmits that transaction number and current date to the offer redemption terminal 301. Next, all of the customer's purchases are scanned by the POS terminal 302 and the customer surrenders their offers to the cashier for redemption 303. The cashier then inserts each offer individually into the reader slot in the offer redemption terminal 304.

Once an offer has been inserted into the slot, the offer redemption terminal senses its presence, and reads and decodes the coded data printed on the offer 305. If the offer redemption terminal can decode the coded data 306, the decoded data is sent to the POS terminal 307. The POS terminal passes the offer data on to the store portal 308. If the coded data on the offer is unreadable, the offer redemption terminal begins looking for a new offer to scan 316.

When the store portal receives the offer's decoded data, it first attempts to validate the offer by searching the local copy of the offer registry (stored on the store portal 105 or the controlled offer redemption system computer 110, depending on the embodiment) for a matching record 309. Offers that do not have a matching record in the registry are rejected 317 and cashier intervention is requested 319. Offers that pass this validation test 309 are passed onto the verification process 310.

During the verification process 310, the POS purchase event transaction log ("TLOG") and the local copy of the offer registry are scanned to verify that the offer's redemption requirements have been met (such as the correct product family item, size, quantity, combination, etc.) and that the offer is being redeemed through a retailer properly authorized to redeem the offer. If all of the offer's requirements have not been met, an error message is displayed on the POS terminal's display 318 and cashier intervention is requested 319.

If all of the offer's requirements have been met, the offer passes the verification test 311, and the POS terminal sends a command to the offer redemption terminal instructing the offer redemption terminal to turn on its shredder so that the offer can be destroyed 312 and the appropriate value of the offer is deducted from the customer's purchase. After the offer destruction is complete, the offer redemption terminal calculates a unique "token" based on the offer redemption transaction 313.

The token is a number that is calculated based on a mathematical algorithm, which can be based on any number of variables from the offer redemption transaction. The token can be based on any desired mathematical algorithm without affecting the operation of the system, but the algorithm should be kept confidential to maintain the integrity of the system.

Thus, in the preferred embodiment of the present invention, the algorithm for calculating the token resides securely within the flash memory of the microprocessor of the offer redemption terminal. Such security prevents the algorithm from being extracted or read, thereby minimizing the likelihood that the algorithm may be determined by reverse engineering of the machine code.

In the preferred embodiment of the present invention, the token created upon redemption of a manufacturer's offer is based on a proprietary mathematical algorithm that may use a combination of any of the following numeric variables:

the manufacturer's UCC number (encoded in the offer's UPC coupon barcode);
the offer family code (encoded in the offer's UPC coupon barcode);
the offer value code (encoded in the offer's UPC coupon barcode);
the offer issue number (encoded in the offer's UCC/EAN-128 coupon barcode);
the retailer's UCC number;
the retailer's division number;
the retailer's store number;
the current transaction date;
the current transaction number from the POS terminal;
the current transaction lane number; and,
the current transaction cashier's number.

The preferred algorithm used for redemption of manufacturers' offers, retailers' offers, cooperative offers (including dynamic cooperative offers) and charitable offers may use different variables to create the tokens for each such offer.

Again, it should be noted, and those skilled in the art will appreciate, that the exact algorithm used to generate the token is not critical to the operation of the present invention, and any number of algorithms may be used. However, as is obvious to those skilled in the art, the more complex the algorithm, the more secure the token generation operation and the less likely the controlled offer redemption system of the present invention may be compromised.

After the token is generated, the token then is transmitted to the POS terminal 314 where it is appended to the offer's redemption entry in the TLOG 315.

When all offers have been processed in the manner previously described 316, the POS terminal cashes out the purchase event and transmits the TLOG to the store POS controller/store portal 105. The store POS controller/store portal 105 hears this message, closes the current transaction, removes all entries from the TLOG that are not associated with an offer redemption and transmits the modified TLOG to the offer clearinghouse for further processing 320.

Offer Redemption Terminal

Figure 4:
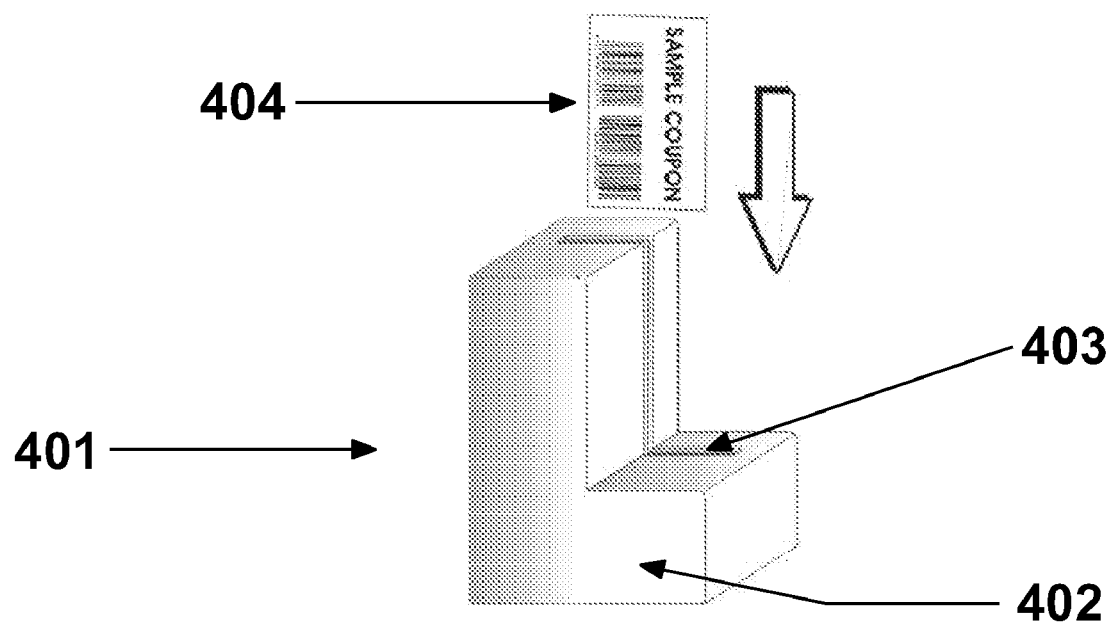
FIG. 4 is a perspective view of the offer redemption terminal in the preferred embodiment of the present invention.

As shown in FIG. 4, the offer redemption terminal 401 is a type of document shredder with the internal capability to read and decode coded information. Although the device is specifically designed to process redemption offers in the retail environment, the general construction of such devices is well known in the prior art. The exterior of the offer redemption terminal in the preferred embodiment of the present invention is shown in FIG. 4, and generally comprises an exterior housing 402 and slot 403 for receiving offers 404.

Figure 5:
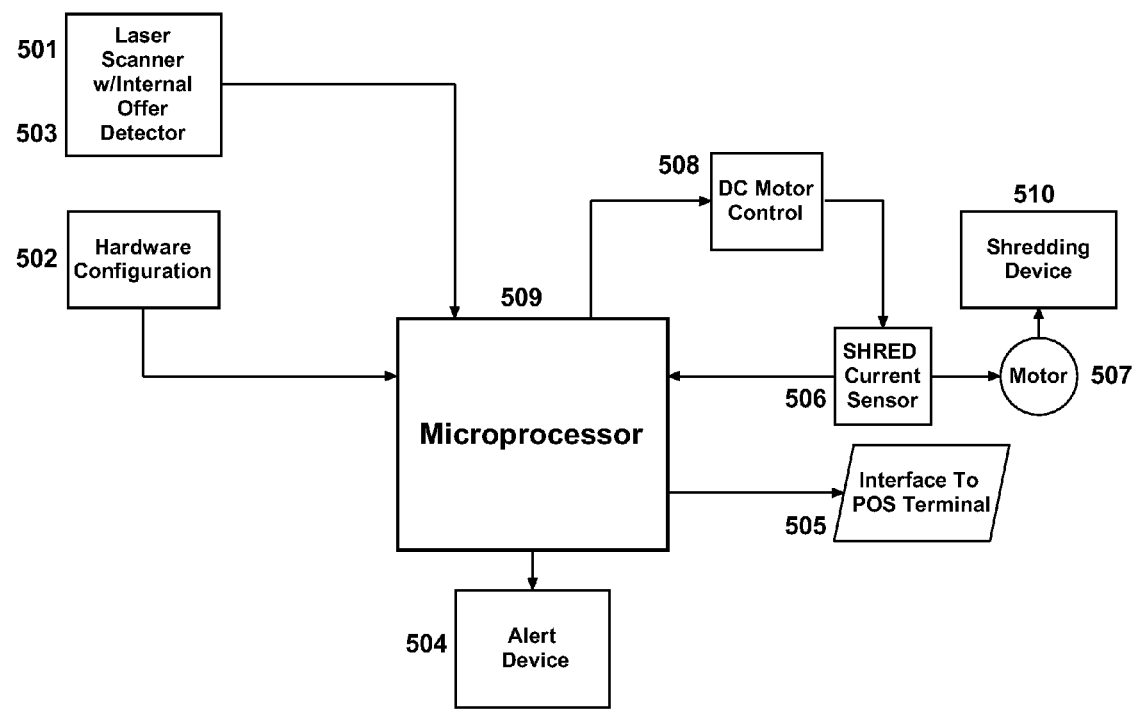
FIG. 5 is a block diagram of the offer redemption terminal in the preferred embodiment of the present invention.

FIG. 5 shows the configuration of the offer redemption terminal's internal components, namely: a microprocessor 509, a laser scanner 501 with an internal offer detector 503, an alert device 504, a DC motor control 508, a means to monitor the shredding of the coupon offer 506, a DC motor 507 connected to a shredding device 510, a hardware configuration data storage means 502, and an interface 505 to the retailer's POS terminal.

Figure 6:
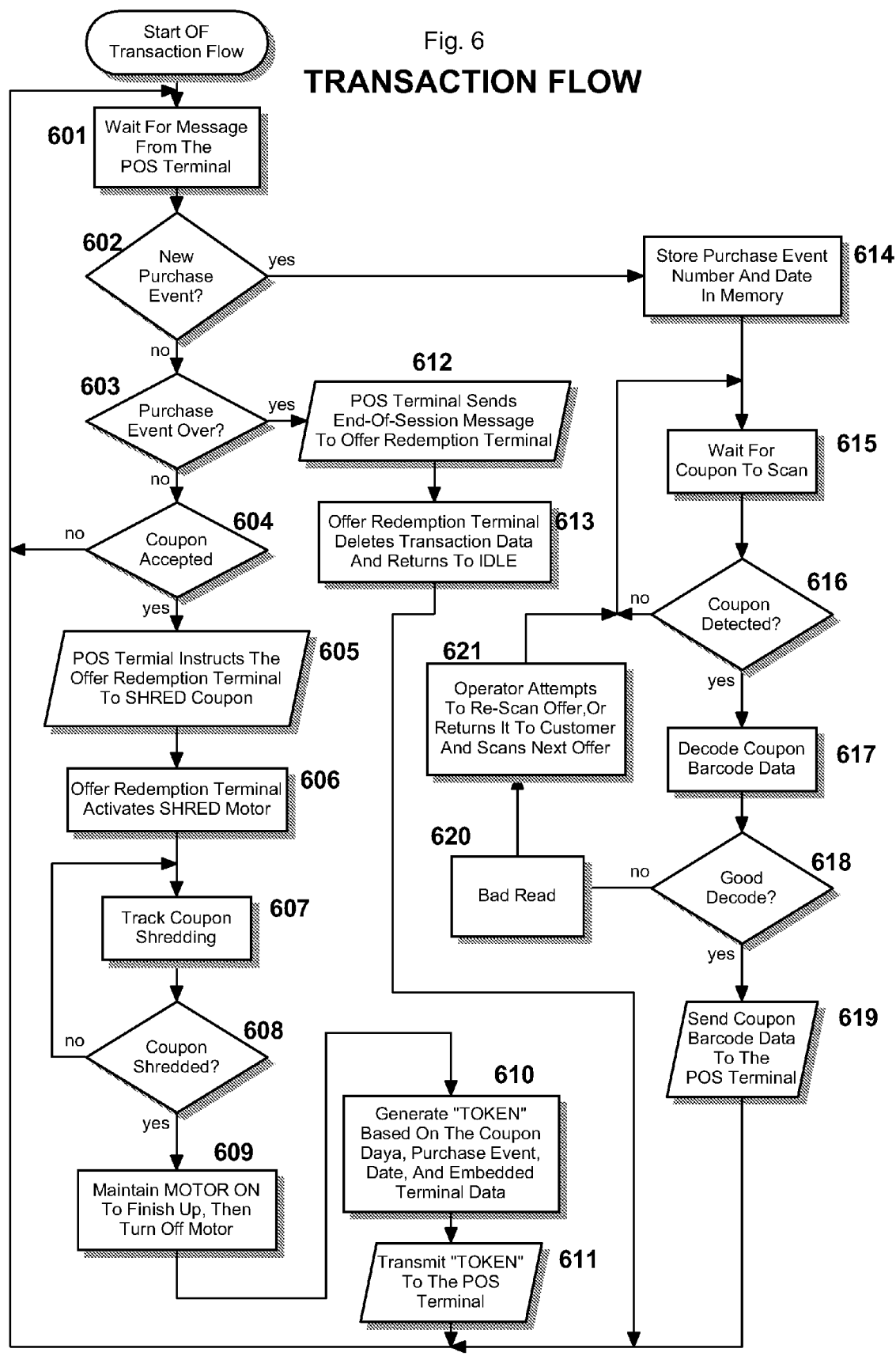
FIG. 6 is a flowchart showing the operation of the offer redemption terminal in the preferred embodiment of the present invention.

In operation, as shown in FIG. 6, the offer redemption terminal 401 remains passive until it receives a new purchase event communication from the retailer's POS terminal 601. The new purchase event message 602 causes the offer redemption terminal 401 to store the purchase event number and date in its memory 614 and causes the offer redemption terminal 401 to begin looking for an offer 404 to be inserted into its reader slot (403) 615. When an offer 404 is detected 616 using offer detector 503, the offer redemption terminal 401 activates its laser scanner 501 and attempts to locate and decode the coded data on the offer (404) 617.

In the preferred embodiment, the offer's 404 coded data must have both a UPC coupon code and UCC/EAN-128 coupon extended offer code portion or an RSS code to be valid (further barcode symbology may require other code portions). The coded data is read and decoded using standard, prior art reading and decoding technology. Properly decoded data 618 is forwarded to the POS terminal for validation and verification 619, as described above. If the offer 404 cannot be read (that is, the coded data on the offer 404 cannot be decoded) 620, the cashier then can either try to reinsert the offer 404 into the offer redemption terminal 401, or return it to the customer 621.

If the offer 404 has been properly validated and verified by the POS terminal 604, the POS terminal sends a shred message to the offer redemption terminal (401) 605. When a shred message is received from the POS terminal, the offer redemption terminal 401 activates the shredding device 510 and destroys the offer 404, rendering it invalid for subsequent use 606.

To ensure that the offer 404 has been destroyed, the offer's 404 progress preferably is tracked as it moves toward and through the shredding device (510) 607. Such tracking may be accomplished using any number of sensors as are known to those skilled in the art. The tracking process precludes a cashier from inserting a blank document into the paper path after an offer has been read and then extracting the offer 404 when the shredding process begins. Once the offer 404 has been shredded 608, the shredder motor remains active for a short period to ensure that the entire document has been destroyed 609.

In another embodiment of the present invention, destruction of the offer 404 may be confirmed by monitoring the current of the motor 507 using, for example, a current sensor 506. Since the motor current increases as the motor 507 operates the shredding device 510 to destroy the offer 404, and decreases once the offer 404 has passed through the shredding device 510, monitoring the motor current will provide confirmation that the offer 404 has passed through the shredding device 510.

Those skilled in the art will recognize that other offer destruction sensing means exist in the prior art and any such means to confirm the destruction of an offer may be utilized within the system of the present invention without departing from the scope of this disclosure.

Once the offer 404 has been destroyed, the offer redemption terminal 401 generates the token, as previously described, to uniquely identify the offer redemption transaction 610. The token is transmitted to the POS terminal which appends it to the offer redemption entry in the purchase event's TLOG 611.

When the POS terminal closes the purchase event 603, a message is sent to the offer redemption terminal 401 to indicate the end of that session 612. The offer redemption terminal 401 then deletes the current transaction data and returns to its idle state until the next purchase event 613. The TLOG, along with all appended tokens, is stored in the POS controller/store portal 105 for transmission to the offer clearinghouse.

Offer Clearinghouse

The offer clearinghouse ("clearinghouse") is a software program operating on a computer that performs the final validation and verification of all offers redeemed through the controlled offer redemption system of the present invention, generates all invoicing to the participating manufacturers, and transfers the offer redemption amounts and handling fees to the participating retailers.

Figure 7:
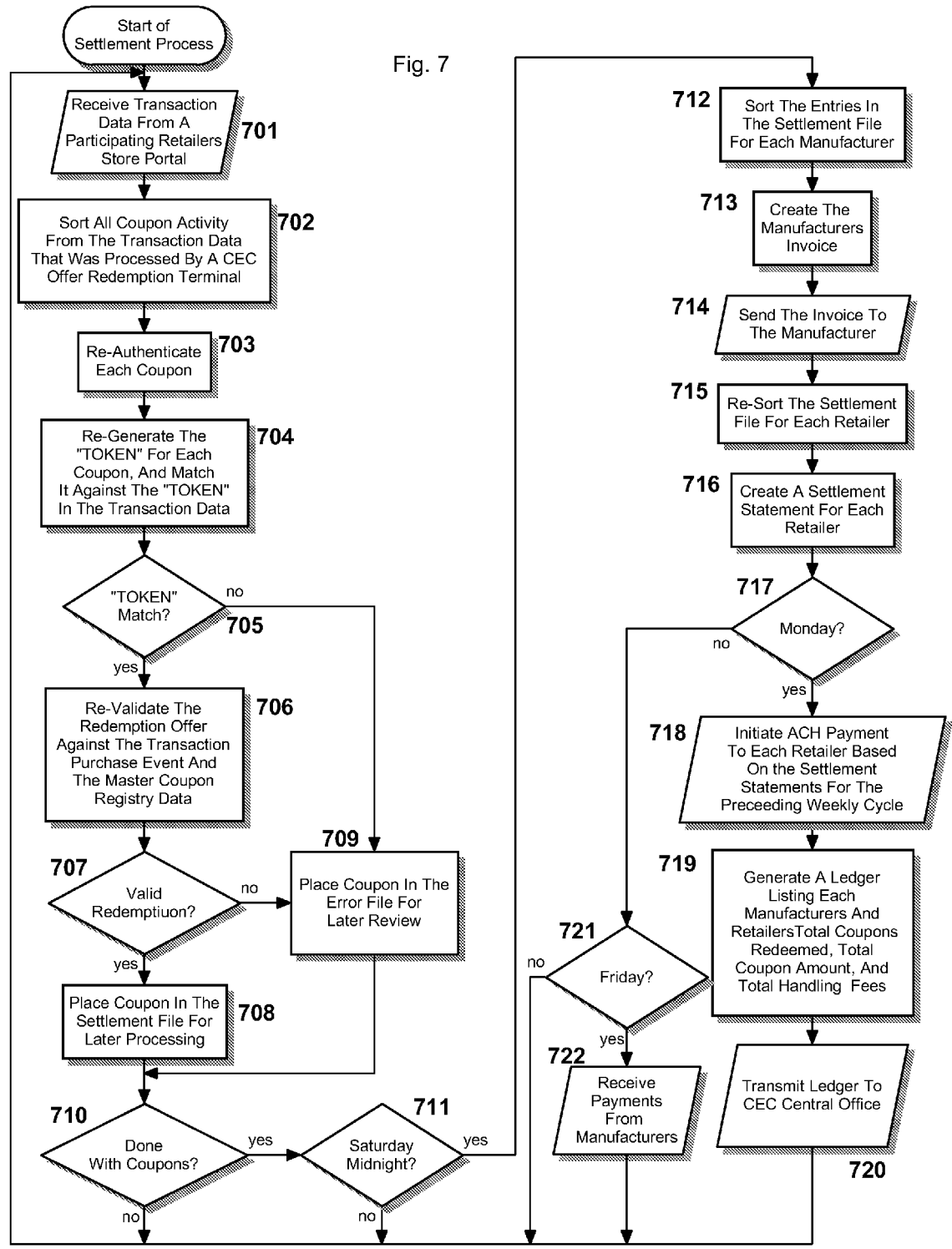
FIG. 7 is a flowchart showing the operation of the settlement process at the offer clearinghouse in the preferred embodiment of the present invention.

As shown in FIG. 7, the clearinghouse receives the purchase event transaction logs ("TLOGs") from cashed out purchase events as communicated from the POS controller/store portal 105 at participating retailers 701. The clearinghouse first sorts the TLOG offer redemption activity 702. Each of the redeemed offers then is authenticated 703 by regenerating the token using the same data and algorithm that the offer redemption terminal used to create the initial token 704.

In the preferred embodiment, the token can be regenerated by passing the TLOG data from the clearinghouse to an attached serial token regeneration device. In another embodiment, the token may be regenerated using a software component of the clearinghouse programming. Either method regenerates the token using the proper algorithm and communicates the token back to the clearinghouse. As in the offer redemption terminal discussed above, the algorithm for calculating the token resides securely within clearinghouse computer or the serial device. Such security prevents the algorithm from being extracted or reverse engineered.

If the two tokens match 705, then the authentication is considered complete. Next the offer is reverified and revalidated against the purchased items in the TLOG and offer requirements listed in the offer's registry record 706. Once this test has been successfully completed 707, the offer is placed into an electronic settlement file 708. Offers in the settlement file then await further processing as described below.

If the initial token and the regenerated token do not match, or if the offer fails reverification and/or revalidation, the offer is placed in an electronic error file for later manual review 709. Offers in the "error" file are manually processed to verify the legitimacy of their redemption and are manually reimbursed when their status has been cleared. The authentication, reverification, and revalidation cycle is repeated for each offer 710.

The settlement file is sorted regularly, every Saturday at midnight 711 in one embodiment, and at more frequent intervals (such as nightly) in other embodiments. The first sort of the settlement file sorts redeemed offers by manufacturer 712. Once the offers are sorted, the clearinghouse creates 713 and sends 714 invoices to all participating manufacturers for which offers have been redeemed. The invoices list the quantity and dollar amount of each offer redeemed during the preceding interval and its associated handling fee. Such redeemed offers include all offers for which the manufacturer owes a payment, including manufacturer's offers, cooperative offers and charitable offers. Invoices to the manufacturers may be sent by email (in the preferred embodiment), facsimile, and/or postal mail. In the preferred embodiment, manufacturer's payment 722 of invoices to the clearinghouse is due by the Friday 721 following the invoice date.

The settlement file then is re-sorted by retailer 715 and settlement statements for each participating retailer are prepared 716. The settlement statements list the quantity, dollar amount, and the retailer's handling fees associated with those offers redeemed at each of the retailer's stores. In the preferred embodiment, this statement is electronically transmitted to the retailer, but may also be sent by facsimile and/or postal mail.

In the preferred embodiment, on the Monday following the Friday due date for payments from the manufacturers 717, the clearinghouse initiates automated clearinghouse (ACH) payments to the retailers' bank accounts for the amounts reflected on the settlement statements for the previous cycle offer redemption activity 718, as well as ACH payments to any charitable organizations that are entitled to payment by manufacturers or retailers as a result of the redemptions of charitable offers.

The clearinghouse then generates a ledger for internal recordkeeping purposes 719. The ledger lists each participating manufacturer, their total offers redeemed, the total offer dollar amount, and the total handling fees associated with those offer. There are also line items for each participating retailer. These entries include the total offers redeemed at each of the retailer's stores, the total offer dollar amount, and the total dollar amount of their handling fees. For tax purposes, payments made to charitable organizations as a result of redemption of charitable offers are also included on the ledger. For secure storage, in the preferred embodiment the ledger is transmitted to a storage facility 720.

It will be appreciated that the timing for the above mentioned manufacturers' invoices, manufacturers' payment on such invoices, retailer's settlement statements, retailer's and charitable organizations' ACH payments, and ledger generation may vary from those identified in the preferred embodiment without departing from the scope and spirit of this invention. For example, manufacturers' invoices may be settled nightly instead of weekly and payments from manufacturers made the following day, with payments to retailers following a day after such manufacturers' payments.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

What is claimed is:

1. A method for dynamically creating a cooperative offer and redeeming the cooperative offer, the method comprising the steps of:

receiving, by a first server, at least one or more of a manufacturer's offer uploaded to an offer registry by a manufacturer;

receiving, by the first server, at least one or more of a retailer's offer uploaded to the offer registry by a retailer;

selecting, by the retailer, the at least one or more of the manufacturer's offer to be combined with the at least one or more retailer's offer;

generating, by the first server, a cooperative offer by combining the at least one or more manufacturer's offer with the at least one or more retailer's offer, wherein the cooperative offer comprises the manufacturer's offer plus the retailer's offer;

validating, by a second server, the cooperative offer presented by a consumer to a retailer upon redemption by comparing the cooperative offer to the offer registry;

verifying, by the second server, the cooperative offer presented by the consumer by comparing the cooperative offer to a purchase event transaction log and by comparing the retailer to a database of authorized retailers;

permanently destroying the cooperative offer by an offer redemption terminal after the cooperative offer is validated and verified;

generating, by the offer redemption terminal, an initial token after the cooperative offer is permanently destroyed;

creating, by the first server, a regenerated token based upon data collected during redemption of the cooperative offer; and authenticating, by the first server the redemption of the cooperative offer by comparing the initial token and the regenerated token.

2. The method of claim 1 further comprising the step of creating an electronic copy of the cooperative offer.

3. The method of claim 2 further comprising the step of providing the electronic copy of the cooperative offer to the retailer.

4. The method of claim 2 wherein the electronic copy of the cooperative offer comprises encoded data specifying at least one redemption condition for the cooperative offer.

5. The method of claim 2 wherein the electronic copy of the cooperative offer comprises encoded data specifying a value of the cooperative offer.

6. The method of claim 1 wherein the offer registry is accessible via an Internet web site.

7. The method of claim 1, further comprising the steps of:
generating a manufacturer's invoice;
generating a retailer's statement; and
automating payment from the manufacturer to the retailer for the redemption of the cooperative offer.

8. The method of claim 1 wherein the initial token and the regenerated token are generated using an algorithm based on a plurality of data collected during redemption of the cooperative offer.

9. The method of claim 8 wherein the algorithm comprises a plurality of variables.

10. The method of claim 9 wherein the plurality of variables comprises at least two of the following variables:
a manufacturer's UCC number;
a manufacturer's offer family code;
a manufacturer's offer value code;
a manufacturer's offer issue number;
a retailer's UCC number;
a retailer's division number;
a retailer's store number;
a current transaction date;
a current transaction number;
a current transaction lane number; and,
a current transaction cashier's number.

11. The method of claim 1 further comprising the step of registering the cooperative offer in the offer registry.

* * * * *

UNITED STATES PATENT AND TRADEMARK OFFICE
CERTIFICATE OF CORRECTION

| | | |
|---|---|---|
| PATENT NO. | : 8,090,615 B1 | Page 1 of 1 |
| APPLICATION NO. | : 11/765026 | |
| DATED | : January 3, 2012 | |
| INVENTOR(S) | : William R. Cunningham | |

It is certified that error appears in the above-identified patent and that said Letters Patent is hereby corrected as shown below:

In Figure 2, with respect to the block labeled with reference numeral "2" (located between block "204" and block "206") the reference numeral "2" should deleted and replaced with reference numeral "205".

In Figure 7, with respect to the block labeled with reference numeral "707", the phrase "Valid Redemptiuon?" should read "Valid Redemption?".

Signed and Sealed this
Fourteenth Day of August, 2012

David J. Kappos
*Director of the United States Patent and Trademark Office*